US009073755B2

(12) United States Patent
Muneoka et al.

(10) Patent No.: US 9,073,755 B2
(45) Date of Patent: Jul. 7, 2015

(54) SPHERICAL ALUMINUM NITRIDE POWDER

(75) Inventors: Takatoshi Muneoka, Shunan (JP); Kazutaka Watanabe, Shunan (JP)

(73) Assignee: TOKUYAMA CORPORATION, Shunan-shi (JP)

( * ) Notice: Subject to any disclaimer, the term of this patent is extended or adjusted under 35 U.S.C. 154(b) by 38 days.

(21) Appl. No.: 13/820,384

(22) PCT Filed: Aug. 31, 2011

(86) PCT No.: PCT/JP2011/069815
§ 371 (c)(1),
(2), (4) Date: Mar. 1, 2013

(87) PCT Pub. No.: WO2012/029868
PCT Pub. Date: Mar. 8, 2012

(65) Prior Publication Data
US 2013/0164534 A1 Jun. 27, 2013

(30) Foreign Application Priority Data
Sep. 3, 2010 (JP) ................................. 2010-198234

(51) Int. Cl.
C01B 21/072 (2006.01)

(52) U.S. Cl.
CPC ........... *C01B 21/0726* (2013.01); *C01B 21/072* (2013.01); *Y10T 428/2982* (2015.01); *C01P 2004/03* (2013.01); *C01P 2004/32* (2013.01); *C01P 2004/61* (2013.01); *C01P 2006/12* (2013.01)

(58) Field of Classification Search
USPC ........... 428/402; 419/23, 34, 45, 57; 264/125, 264/332; 423/409, 412; 501/98.4
IPC ....................................... C01B 21/0726,21/072
See application file for complete search history.

(56) References Cited

U.S. PATENT DOCUMENTS

| 4,615,863 | A | * | 10/1986 | Inoue et al. ...................... 419/23 |
| 5,114,695 | A | * | 5/1992 | Jain et al. ...................... 423/411 |
| 2002/0047110 | A1 | | 4/2002 | Takao et al. |
| 2005/0173094 | A1 | | 8/2005 | Mori |
| 2010/0255304 | A1 | | 10/2010 | Amano et al. |
| 2013/0164534 | A1 | | 6/2013 | Muneoka et al. |
| 2013/0171451 | A1 | | 7/2013 | Muneoka et al. |
| 2013/0244036 | A1 | | 9/2013 | Muneoka et al. |

FOREIGN PATENT DOCUMENTS

| JP | 62-207703 | A | 9/1987 |
| JP | 0271353 | A2 | 6/1988 |
| JP | 64-56308 | A | 3/1989 |
| JP | 1-119573 | A | 5/1989 |
| JP | 3-23206 | A | 1/1991 |
| JP | 4-74705 | A | 3/1992 |
| JP | 5-139709 | A | 6/1993 |
| JP | 5-221618 | A | 8/1993 |
| JP | 9-52704 | A | 2/1997 |
| JP | 11-269302 | A | 10/1999 |
| JP | 2002-97006 | A | 4/2002 |
| JP | 2002-179413 | A | 6/2002 |
| JP | 2005-132699 | A | 5/2005 |
| JP | 2005-162555 | A | 6/2005 |
| JP | 101830448 | A | 9/2010 |
| TW | I315296 | B | 10/2009 |
| WO | WO 2003/097527 | A1 | 11/2003 |
| WO | WO 2009/066663 | A | 5/2009 |

OTHER PUBLICATIONS

International Search Report issued in PCT/JP2011/069815, mailed on Nov. 22, 2011.
Chinese Office Action dated May 21, 2014, issued in corresponding Chinese Patent Application No. 201180041078.2.
Chinese Office Action dated Sep. 5, 2014 in Chinese Patent Application No. 201180041466.0.
Chinese Office Action issued on Jan. 6, 2014 in Chinese Patent Application No. 201180005141.7.
Extended European Search Report dated May 8, 2014, issued in European Patent Application No. 11737197.1.
International Search Report for PCT/JP2011/072098 dated Jan. 10, 2012.
International Search Report issued in PCT/JP2011/051886, mailed on Apr. 19, 2011.
Japanese Office Action dated Sep. 2, 2014, issued in Japanese Patent Application No. 2011-551953.
T. Suehiro et al.; Morphology-retaining synthesis of AlN particles by gas reduction-nitridation; Materials Letters; No. 57; 2002; pp. 910-913.
U.S. Office Action for U.S. Appl. No. 13/516,268, dated May 7, 2014.
U.S. Office Action for U.S. Appl. No. 13/823,017, dated Oct. 7, 2014.
Taiwanese Office Action and Search Report, dated Jan. 16, 2015, for Taiwanese Application No. 100131765.

* cited by examiner

*Primary Examiner* — Leszek Kiliman
(74) *Attorney, Agent, or Firm* — Birch, Stewart, Kolasch & Birch, LLP

(57) ABSTRACT

[Problems]
To provide a spherical aluminum nitride powder that features high thermal conductivity and filling property, and that is useful as a filler for a heat radiating material, and a method of producing the same.

[Means for Solution]
A spherical aluminum nitride powder comprising aluminum nitride particles having an average particle diameter of 3 to 30 μm, a sphericalness of not less than 0.75, and an oxygen content of not more than 1% by weight wherein, when the average particle diameter is d (μm), the specific surface area S (m²/g) satisfies the following formula (1), $$(1.84/d) \leq S \leq (1.84/d + 0.5) \quad (1).$$

2 Claims, 1 Drawing Sheet

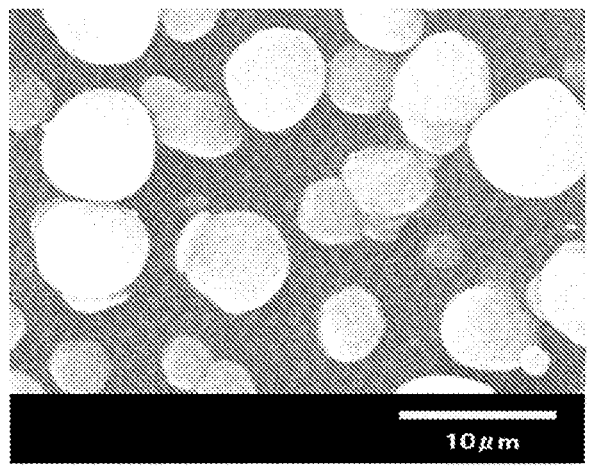

SPHERICAL ALUMINUM NITRIDE POWDER

TECHNICAL FIELD

This invention relates to an aluminum nitride powder that can be favorably used as a filler for heat radiating materials for improving heat radiating property by being filled in a resin, a grease, an adhesive or a coating material, and to a method of producing the same.

BACKGROUND ART

The aluminum nitride has such an excellent electrically insulating property and a high thermal conductivity that it has been expected that the materials such as resin, grease, adhesive and coating material filled with a sintered product or a powder of the aluminum nitride can be used as heat radiating materials featuring a high thermal conductivity.

In order to improve the thermal conductivity of the heat radiating materials, it is important to densely fill the matrix such as resin with a filler having a high thermal conductivity. For this purpose, it has been strongly urged to provide an aluminum nitride powder of a spherical shape having a particle diameter of from about several microns to about several tens of microns.

The aluminum nitride powder has, usually, been produced by an alumina reductive nitridation method which reductively nitrides a composition of alumina and carbon, a direct nitridation method which reacts aluminum directly with nitrogen, and a gas-phase method which reacts alkylaluminum with ammonia and, thereafter, heats them. Of them, the aluminum nitride powders obtained by the reductive nitridation method and by the gas-phase method have shapes close to a sphere but their particle diameters are still of the order of submicrons.

According to the direct nitridation method, on the other hand, the aluminum nitride powder is obtained through the pulverization and classification, making it relatively easy to control the particle diameter, i.e., making it possible to obtain the aluminum nitride powder having particle diameters of from about several microns to about several tens of microns. However, the particles constituting the powder are angular non-spherical particles. Therefore, the aluminum nitride powder obtained by the above method cannot be highly densely filled in the resin.

Therefore, a variety of methods have been studied in order to obtain the aluminum nitride powder of a spherical shape having a desired particle diameter.

For example, a patent document 1 discloses a method of obtaining an aluminum nitride powder of a rounded shape having an average particle diameter of not less than 3 μm by firing a mixture of an alumina powder and a carbon powder in an inert atmosphere to form an aluminum carbide permitting particles thereof to grow and then firing the particles thereof in a non-oxidizing atmosphere containing nitrogen. However, though the aluminum nitride powder obtained by this method is of a round shape, the powder is still of an elliptic shape having a low sphericalness. Therefore, there is room for improvement concerning the aptitude to being filled in the resin.

Further, a patent document 2 discloses a method of producing a spherical aluminum nitride powder having an average particle diameter of not more than 50 μm, a sphericalness of not less than 0.8 and excellent water-resisting property by reductively nitrogenating a spherical alumina with a nitrogen gas or an ammonia gas in the presence of carbon and, thereafter, oxidizing the surfaces thereof. According to this production method, however, the spherical shape of the starting alumina becomes directly the shape of the aluminum nitride powder which is the final product, and it is necessary to use the alumina having a large particle diameter equal to the desired particle diameter. With the alumina having such a large particle diameter being reductively nitrided, however, the reaction must be conducted for an extended period of time to improve the conversion. As a result, the oxygen concentration increases in the obtained aluminum nitride powder, and the surfaces of the particles become more rugged making it difficult to obtain the aluminum nitride powder having smooth particle surfaces and lowering the aptitude to being filled in the resin or the like.

On the other hand, a patent document 3 discloses a method of producing an aluminum nitride powder by using, as a starting material, a mixed powder of an aluminum oxide powder, a carbon powder and an alkaline earth metal compound or a rare earth element compound, and firing the mixed powder in a non-oxidizing atmosphere containing nitrogen. This method is to form the aluminum nitride at a low temperature of not higher than 1,500° C. by utilizing the action of the alkaline earth metal compound or the rare earth compound for accelerating the reaction. However, the aluminum nitride powder obtained by this method has a particle diameter of, concretely speaking, about 1 μm, and the particle diameter of the order of several microns has not still been realized. The document, further, shows an aluminum nitride powder having a particle diameter of 3 μm as Comparative Example. However, though the particle shape is spherical, it is still difficult to obtain aluminum nitride particles having sufficiently smooth surfaces.

Further, a patent document 4 discloses a method of obtaining a crystalline aluminum nitride powder by ripening (heat-treating) an amorphous aluminum nitride powder in a flux comprising compounds of alkaline earth elements or rare earth elements so as to assume a spherical shape and, thereafter, dissolving the flux to isolate the crystalline aluminum nitride powder. This production method produces aluminum nitride particles capable of achieving a high fluidity and a high filling ratio. During the heat treatment, however, impurities such as oxygen and the like easily infiltrate into the aluminum nitride powder making it difficult to suppress the concentration of impurities to be low.

PRIOR ART DOCUMENTS

Patent Documents

Patent document 1: JP-A-3-23206
Patent document 2: JP-A-2005-162555
Patent document 3: JP-A-5-221618
Patent document 4: JP-A-2002-179413

OUTLINE OF THE INVENTION

Problems that the Invention is to Solve

It is, therefore, an object of the present invention is to provide a spherical aluminum nitride powder comprising spherical aluminum nitride particles having particle diameters of from about several microns to about several tens of microns, having very smooth surfaces, having very decreased concentration of impurities such as oxygen and the like and, therefore, featuring high thermal conductivity and filling property, and is to provide a method of producing the same.

Means for Solving the Problems

In order to solve the above problems, the present inventors have conducted keen research, have succeeded in obtaining an aluminum nitride powder of spherical aluminum nitride particles having smooth surfaces, a high sphericalness and a considerably low concentration of impurities such as oxygen and the like yet having particle diameters of several microns to several tens of microns by using a mixed powder of an alumina or an alumina hydrate having small particle diameters, a carbon powder and a specific eutectic agent capable of melting together with the alumina at a specific ratio, and reductively nitrogenating the mixed powder at a specific temperature, and have completed the present invention.

That is, according to the present invention, there is provided a spherical aluminum nitride powder having an average particle diameter of 3 to 30 μm, a sphericalness of not less than 0.75, and an oxygen concentration which is suppressed to be not more than 1% by weight wherein, when the average particle diameter is d (μm), the specific surface area S (m²/g) satisfies the following formula (1), $$(1.84/d) \leq S \leq (1.84/d + 0.5) \quad (1)$$

wherein d is the average particle diameter.

According to the present invention, further, there is provided a method of producing the spherical aluminum nitride powder maintaining good reproducibility, comprising:

providing an alumina or an alumina hydrate having an average particle diameter of not more than 2 μm, a eutectic agent of an oxide, a carbide or a halide of an alkaline earth metal that is capable of melting together with the alumina at 1200 to 1800° C., and a carbon powder;

mixing 100 parts by mass of the alumina or the alumina hydrate, 0.5 parts by mass to 50 parts by mass of the eutectic agent, and the carbon powder of such an amount that the weight ratio thereof to the alumina or the alumina hydrate ($C/Al_2O_3$) is from 0.38 to 0.44; and reductively nitrogenating the alumina or the alumina hydrate by holding the mixture in a nitrogen-containing atmosphere at a temperature of 1620 to 1800° C. for not less than 2 hours.

In the present invention, the average particle diameter stands for a particle diameter of when a cumulative volume is 50% in the particle size distribution as measured by the laser diffraction/scattering method.

Further, the oxygen concentration stands for a ratio of the total amount of oxygen present in the aluminum nitride powder. The oxygen includes oxygen solidly dissolved in the aluminum nitride, oxygen contained in the oxide film on the surfaces of the aluminum nitride particles, oxygen remaining in the aluminum nitride powder due to the starting alumina or the alumina hydrate that has not been nitrided, and oxygen contained in water adsorbed by the surfaces of the aluminum nitride powder and, further, includes oxygen contained in the eutectic agent when the eutectic agent remains.

The oxygen concentration can be measured by a method described in Example appearing later.

Further, the sphericalness is a value found from a short diameter of particle/a long diameter of particle, and approaches the true sphere as the value approaches 1.

Effects of the Invention

The spherical aluminum nitride powder of the invention comprises particles having a high sphericalness yet assuming particle diameters of from about several microns to about several tens of microns and, further, having very smooth surfaces and very decreased concentration of impurities such as oxygen and the like. For instance, when the specific surface area satisfies the above formula (1), it means that the particle surfaces are smooth.

That is, due to a high sphericalness and surface smoothness, the aluminum nitride powder can be highly densely filled in the matrix such as resin. Besides, the spherical aluminum nitride particles of the present invention have been nitrided up to the interior thereof, have very low concentration of impurities such as oxygen and the like and, therefore, feature a high thermal conductivity by themselves, making it possible to impart a high conductivity to the matrix such as resin in which the spherical aluminum nitride particles are filled.

Therefore, the spherical aluminum nitride powder of the present invention is useful as a filler for such materials as resin, grease, adhesive and coating material. By using the spherical aluminum nitride powder as a filler, there is provided a heat radiating material having high thermal conductivity.

The above spherical aluminum nitride powder is produced maintaining good reproducibility by using an alumina or an alumina hydrate (hereinafter simply called Al source) having an average particle diameter of not more than 2 μm, a eutectic agent of an oxide, a carbide or a halide of an alkaline earth metal capable of melting together with the alumina at 1200 to 1800° C. and a carbon powder, mixing these compounds at a specific weight ratio, and reductively nitrogenating the mixture under specific conditions.

As for the mechanism for obtaining the spherical aluminum nitride powder of the present invention by the above production method, the present inventors presume as described below.

That is, the method of the present invention uses the Al source having a specific fine particle diameter as well as the eutectic agent capable of melting together with the alumina. In conducting the reductive nitridation at a temperature of 1620 to 1800° C., therefore, a liquid phase is, first, formed in which the alumina is dissolved. Further, since carbon is used at a predetermined ratio relative to the alumina source, the alumina dissolves in an adjusted amount in the liquid phase to form an aggregated product that has a desired particle diameter. At the same time, the reductive nitridation proceeds. Further, since the reductive nitridation is conducted under a specific temperature condition (1620 to 1800° C.), the eutectic agent is gradually removed (not removed at one time). As a result, it is allowed to obtain the aluminum nitride particles containing impurities such as oxygen and the like in small amounts yet maintaining smooth surfaces of the particles.

BRIEF DESCRIPTION OF THE DRAWING

[FIG. 1] is an electron microphotograph showing the structure of particles in the spherical aluminum nitride powder of the present invention obtained in Example 1 which describes a representative production method.

MODE FOR CARRYING OUT THE INVENTION

<Structure of the Spherical Aluminum Nitride Powder>

The spherical aluminum nitride powder of the present invention assumes the spherical shape with smooth particle surfaces yet having a particle diameter of as relatively large as several microns or more, and features a low oxygen concentration (see FIG. 1).

The spherical aluminum nitride powder has an average particle diameter d (μm) of 3 to 30 μm, preferably, 3.5 to 20 μm and, more preferably, 4 to 10 μm. The present invention has provided, for the first time, the spherical aluminum nitride powder having properties that will be described later yet maintaining the particle diameter in this range.

The spherical aluminum nitride powder of the present invention has a very important feature in that when the average particle diameter thereof is presumed to be d (μm), the specific surface area S (m²/g) lies in a range of the following formula (1).

$$(1.84/d) \leq S \leq (1.84/d+0.5) \quad (1)$$

The above formula represents a range of value of the specific surface area S relative to the average particle diameter d of the aluminum nitride powder, and shows that the surfaces become smoother as the value S becomes smaller to approach the theoretic specific surface area found from the average particle diameter d. Namely, when the specific surface area S of the particles lies in the range satisfying the above formula (1), it means that the surfaces thereof are smooth, and the aluminum nitride powder of the invention comprising the above particles can be very excellently filled in the resin.

In the spherical aluminum nitride powder of the present invention, further, the oxygen concentration has been suppressed to be not more than 1% by weight, specifically, not more than 0.9% by weight and, more specifically, not more than 0.8% by weight. The oxygen concentration is suppressed by the use of a specific eutectic agent that will be described later. The spherical aluminum nitride powder of the invention exhibits a high thermal conductivity as a result of suppressing the oxygen concentration. When this powder is filled in the resin, the thermal conductivity is highly improved.

It was described above that the spherical aluminum nitride powder of the present invention contains oxygen at a total concentration that is suppressed to be lower than a predetermined value. Here, not only the total concentration of oxygen, but also the concentration of oxygen that is solidly dissolved is suppressed to be low.

The concentration of the solidly dissolved oxygen can be determined relying on a lattice constant of C-axis of the aluminum nitride crystal particles measured by using an X-ray diffraction apparatus and by using Si as an external standard material. The lattice constant of C-axis of the AlN crystal particles in the spherical aluminum nitride powder of the present invention assumes a value of not smaller than 4.9800, specifically, not smaller than 4.9802 and, more specifically, not smaller than 4.9804, and from which it is learned that oxygen is solidly dissolving little in the aluminum nitride particles.

Further, the spherical aluminum nitride powder of the present invention has a high sphericalness which is not less than 0.75, specifically, not less than 0.80 and, more specifically, not less than 0.85 which is close to the true sphere.

Usually, when the aluminum nitride is obtained by using the alumina as a starting material and nitrogenating the alumina, the aluminum nitride bonds to other particles and deforms accompanying an increase in the conversion of the aluminum nitride, and the sphericalness tends to decrease. However, the spherical aluminum nitride powder of the present invention has a high sphericalness even when the conversion is 100%, which is a feature.

It is, further, desired that the spherical aluminum nitride powder of the present invention contains cationic impurities in an amount which is suppressed to be not more than 0.3% by weight and, specifically, not more than 0.2% by weight.

<Production of the Spherical Aluminum Nitride Powder>

The spherical aluminum nitride powder of the present invention is produced maintaining good reproducibility by using an Al source, a eutectic agent and a carbon powder, mixing them at a specific weight ratio, reductively nitrogenating the mixture thereof and, further, conducting the decarbonization treatment as required.

1. Al Source.

To produce the spherical aluminum nitride powder of the present invention, an alumina or an alumina hydrate is used as the Al source.

The Al source may be an alumina having a crystal structure such as of α, γ, θ, δ, η, κ or χ, or may be an alumina hydrate such as boehmite, diaspore, gibbsite, bayerite or toddite which, upon heating, is dehydrated and is finally transited wholly or partly into an α-alumina. These compounds may be used in a single kind or being mixed together. As the Al source, the present invention preferably uses the α-alumina, γ-alumina or boehmite that has a specifically high reactivity and that can be easily controlled.

It is necessary that the Al source has an average particle diameter of not more than 2 μm. The particles having an average particle diameter of more than 2 μm do not sufficiently melt with the eutectic agent. As a result, the obtained aluminum nitride powder has a decreased sphericalness and, besides, undergoes the reductive nitridation at a decreased rate making it difficult to obtain the spherical aluminum nitride powder of the present invention.

2. Carbon Powder.

The carbon powder used in the present invention works as a reducing agent, and may be a carbon black or a graphite powder. As the carbon black, there can be preferably used a furnace black, channel black or acetylene black.

The carbon powder that is used has a BET specific surface area of, desirably, 0.01 to 500 m²/g.

3. Eutectic Agent

The eutectic agent used in the present invention is the one that comprises an oxide, a carbide or a halide of an alkaline earth metal, and is capable of melting together with the alumina at 1200 to 1800° C. and, specifically, at 1300 to 1750° C.

When a compound that is capable of melting together with the alumina at a temperature of less than 1200° C. is used as the eutectic agent, the alumina particles used as the Al source easily aggregates together making it difficult to obtain the spherical aluminum nitride powder of the present invention. Further, a compound having the above temperature in excess of 1800° C. does not easily assume the spherical shape and makes it difficult to obtain the spherical aluminum nitride powder of the present invention. This is presumably due to that the liquid phase is not forming at a temperature at which the reductive nitridation that will be described later is conducted.

Examples of the alkaline earth metal include calcium, strontium, barium and magnesium. Further, the halide can be represented by a fluoride. The eutectic agent may comprise a single compound but may often be a combination of a plurality of kinds of compounds.

As the eutectic agent, further, there can be used such a compound that forms an oxide, a carbonate or a halide of an alkaline earth metal exemplified above during the reductive nitridation. For example, there can be exemplified a carbonate, nitrate, acetate or hydroxide of an alkaline earth metal.

In the present invention, though there is no specific limitation on the particle diameter of the eutectic agent, a preferred average particle diameter is, specifically, 0.01 μm to 100 μm and, more specifically, 0.1 μm to 30 μm.

4. Mixing the Starting Materials.

In the present invention, the Al source, carbon powder and eutectic agent are mixed together at a predetermined weight ratio, and are subjected to the reductive nitridation. There is no specific limitation on the mixing method so far as the starting materials are homogeneously mixed together. Usually, however, the mixing is preferably conducted by using a blender, a mixer or a ball mill.

In the present invention, the Al source and the carbon powder must be mixed such that the weight ratio of the carbon powder to the alumina powder ($C/Al_2O_3$) is in a range of 0.38 to 0.44, preferably, 0.39 to 0.43 and, more preferably, 0.40 to 0.42.

If the mixing ratio exceeds 0.44, presence of the alumina or the like used as the Al source becomes sparse hindering the growth of the aluminum nitride particles at the time of firing, and the average particle diameter of the obtained spherical aluminum nitride powder fails to reach the desired range (not less than 3 μm).

Further, if the $C/Al_2O_3$ ratio is less than 0.38, the alumina or the like aggregates vigorously arousing a problem in that the aluminum nitride powder obtained after the reaction contains coarse particles much.

The mixing ratio of the Al source and the eutectic agent should be such that the amount of the eutectic agent is 0.5 to 50 parts by mass, preferably, 1 part by mass to 25 parts by mass and, more preferably, 2 parts by mass to 10 parts by mass per 100 parts by mass of the Al source. If the amount of use of the eutectic agent is smaller than the above range, it becomes difficult for the aluminum nitride particles to assume the spherical shape and, besides, the lattice constant of C-axis of the aluminum nitride crystal particles becomes small (concentration of the solidly dissolved oxygen increases). This is presumably due to that the liquid phase is not forming in a sufficiently large amount at the time of reductive nitridation.

Further, even if the eutectic agent is used in an amount larger than the above range, no more effect is obtained for attaining the spherical shape but, rather, the eutectic agent remains as impurity in the aluminum nitride powder, and the heat radiating material filled therewith exhibits a decreased thermal conductivity. Moreover, at the time of firing, the alumina scatters together with the eutectic agent, and the yield decreases.

5. Reductive Nitridation Treatment.

The mixture of the Al source, carbon powder and eutectic agent mixed at the above ratio is subjected to the reductive nitridation treatment.

The reductive nitridation treatment is carried out by holding the above mixture in a nitrogen-containing atmosphere (e.g., in a nitrogen gas stream) at a temperature of 1620 to 1800° C., preferably, 1650° C. to 1720° C. for 2 to 50 hours and, preferably, 10 to 20 hours.

That is, the reductive nitridation of the Al source is carried out by firing fine particles of the Al source (alumina or alumina hydrate) of an average particle diameter of not more than 2 μm together with the eutectic agent under a condition where the carbon powder which is a reducing agent is present at a temperature maintained in the above range.

If the firing temperature is lower than 1620° C., the surfaces of the AlN particles are not smoothed to a sufficient degree, the specific surface area becomes large, and it becomes difficult to highly fill the AlN particles in the resin. If the firing temperature exceeds 1800° C., on the other hand, the eutectic agent scatters in short periods of time, and an oxynitride (AlON) of a low thermal conductivity is formed to increase the oxygen concentration of the obtained AlN particles. Besides, AlN particles easily aggregate together making it difficult to obtain the spherical aluminum nitride powder of the present invention. Moreover, oxygen tends to be solidly dissolved in the AlN particles which then decrease the thermal conductivity. The amount of oxygen solidly dissolved in the AlN particles can be presumed relying on the lattice constant of C-axis of the AlN crystal particles.

Further, if the time of the reductive nitridation is shorter than 2 hours, the nitridation reaction is not completed, the AlN particles fails to assume the spherical shape and, besides, the lattice constant of C-axis of the AlN crystal particles decreases. On the other hand, if the firing time exceeds 50 hours, the AlN particles aggregate together, and coarse particles tend to be formed.

6. Decarbonization Treatment.

In the present invention, the aluminum nitride powder obtained through the above reaction contains excess of carbon powder. It is, therefore, desired to conduct the decarbonization treatment.

The decarbonization treatment is to remove carbon by oxidation, and is carried out by using an oxidizing gas. As the oxidizing gas, any gas such as the air or oxygen can be used without limitation provided it is capable of removing carbon. From the standpoint of economy and the oxygen concentration in the obtained aluminum nitride, however, the air is preferred. Further, the treating temperature is, usually, 500 to 900° C. and, preferably, 600 to 750° C. by taking into consideration the efficiency of decarbonization and excess of oxidation on the surfaces of the aluminum nitride.

If the oxidizing temperature is too high, the surfaces of the aluminum nitride powder are oxidized to an excess degree often making it difficult to obtain the spherical aluminum nitride powder having a desired oxygen concentration. It is, therefore, desired to select a suitable oxidizing temperature and time.

<Use of the Aluminum Nitride Powder>

By utilizing the properties of the aluminum nitride, the spherical aluminum nitride powder of the present invention can be widely used for a variety of uses and, specifically, as a filler to be filled in heat radiating materials such as heat radiating sheet, heat radiating grease, heat radiating adhesive, coating material and heat conducting resin.

Here, as the matrix of the heat radiating material, there can be used thermosetting resins such as epoxy resin and phenol resin; thermoplastic resins such as polyethylene, polypropylene, polyamide, polycarbonate, polyimide and polyphenylene sulfide; rubbers such as silicone rubber, EPR and SBR; and silicone oils.

Among them, a preferred matrix of the heat radiating material is, for example, an epoxy resin or a silicone resin. To obtain a highly flexible heat radiating material, it is desired to use a liquid silicone rubber of the addition reaction type.

To improve the thermal conductivity of the heat radiating material, it is desired to add the filler in an amount of 150 to 1000 parts by weight per 100 parts by weight of the matrix such as rubber or oil. In addition to the spherical aluminum nitride powder of the invention, the heat radiating material may be, further, filled with any one or a plurality of the fillers such as aluminum nitride powder, pulverized alumina, spherical alumina, boron nitride, zinc oxide, silicon carbide and graphite. The shapes and particle diameters of the spherical aluminum nitride powder of the invention and other fillers may be selected depending on the properties and use of the heat radiating material. For example, when it is attempted to obtain a heat radiating material having a high thermal conductivity, several kinds of AlN powders obtained by other methods can also be used in combination. Concretely, there can be used in combination the spherical aluminum nitride powder of the invention, an aluminum nitride powder having a particle diameter of about 0.1 μm to about 100 μm obtained the reductive nitridation method or the direct nitridation method, and so-called sintered grains obtained by sintering the aluminum nitride granules obtained by spray-drying the above aluminum nitride powders.

When it is attempted to highly fill the resin with the filler, there is preferably employed a method that uses the spherical aluminum nitride powder of the invention and several kinds of spherical aluminas of an average particle diameter of 10 to 100 μm in combination. When it is desired to impart anisotropy to the thermal conductivity of the heat radiating material, there may be used the spherical aluminum nitride powder of the present invention in combination with several kinds of boron nitrides having an average particle diameter of 1 to 50 μm. These fillers may have been treated for their surfaces with, for example, a silane coupling agent, a phosphoric acid or a phosphate.

Further, the ratio of mixing the spherical aluminum nitride powder and other fillers in the heat radiating material can be suitably adjusted over a range of from 1:99 to 99:1. The heat radiating material may be, further, blended with additives such as plasticizer, vulcanizing agent, cure promoter, parting agent and the like.

The above resin composition can be produced by being mixed using a blender or a mixer. The heat radiating material can be produced by forming the resin composition by the press-forming method, extrusion-forming method or doctor blade method followed by heat-curing.

EXAMPLES

The invention will now be described more concretely. It should, however, be noted that the invention is in no way limited to these Examples only. Properties in Examples and in Comparative Examples were measured by the methods described below.

(1) Specific Surface Area.

The specific surface area was measured relying on the BET-dot method.

(2) Average Particle Diameter.

The average particle diameter ($D_{50}$) was measured by dispersing the sample in a solution of sodium pyrophosphate by using a homogenizer and by using a laser diffraction grain size distribution meter (MICRO TRAC HRA manufactured by NIKKISO CO., LTD.).

(3) Sphericalness.

A hundred particles were arbitrarily selected from the electron microphotograph, long diameters (DL) and short diameters (DS) of the particle images were measured by using a scale, and an average value of the ratios (DS/DL) was regarded as the sphericalness.

(4) Yield.

A value twice as great as the mol number of the obtained aluminum nitride was divided by a value of mol number of the alumina that was the starting material, and the obtained value in percent was regarded as the yield of the aluminum nitride powder.

(5) Content of Cationic Impurities.

The content of cationic impurities (concentration of metal elements) in the aluminum nitride powder was determined by melting the aluminum nitride powder with an alkali followed by neutralization with an acid, and taking a measurement by using an ICP emission spectroscope (ICP-S-7510, manufactured by Shimadzu Corporation).

(6) Oxygen Concentration.

The oxygen concentration in the aluminum nitride powder was measured by using an oxygen/nitrogen analyzer (trade name: EMGA-620W, manufactured by HORIBA, Ltd.) and by using a helium gas as the inert gas.

(7) Lattice Constant of C-Axis.

The lattice constant of C-axis of the aluminum nitride powder was measured by using a high-output X-ray apparatus (trade name: RINT-1400, manufactured by Rigaku Corporation.) and by using Si as an external standard material.

(8) Thermal Conductivity of the Silicone Rubber Sheet.

A heat conductive silicone rubber composition was formed in a size of 10 cm×6 cm and in a thickness of 3 mm, was heated and cured in a 150° C. hot air circulation-type oven for 1 hour, and was measured for its thermal conductivity by using a thermal conductivity meter (QTM-500 manufactured by KYOTO ELECTRONICS MANUCAFTURING CO., LTD.). To prevent the leakage through the detector portion, the measurement was taken via a 10 μm-thick polyvinylidene chloride film.

Example 1

There were used an α-alumina having an average particle diameter of 1.2 μm and a specific surface area of 10.7 $m^2/g$ as the Al source, a carbon black (specific surface area, 125 $m^2/g$) as the carbon powder and a calcium carbonate having an average particle diameter of 8.0 μm as the eutectic agent.

The α-alumina and the carbon black were mixed at a ratio of $C/Al_2O_3$=0.42, and the calcium carbonate having the average particle diameter of 8.0 μm was added thereto in an amount of 8.9 parts by mass per 100 parts by mass of the α-alumina and was mixed.

The obtained mixture was fired in a nitrogen atmosphere under the conditions of a firing temperature of 1700° C. for a firing time of 15 hours to reductively nitride the α-alumina.

Thereafter, the oxidation treatment was conducted in the air atmosphere at 700° C. for 12 hours to obtain the aluminum nitride powder. The obtained powder was measured for its specific surface area, average particle diameter, sphericalness, yield, content of cationic impurities, oxygen concentration and lattice constant of C-axis in accordance with the methods described above. The results were as shown in Table 1.

Next,
Aluminum nitride powder obtained above,
900 parts by mass,
Millable-type silicone, 100 parts by mass
(TSE201 manufactured by Momentive Performance Materials Inc.),
Parting agent, 0.5 parts by mass,
were kneaded together by using a pressurized kneader. The kneaded product was cooled, mixed with 0.5 parts by mass of a crosslinking agent by using rolls, and was pressed at 180° C. for 15 minutes to obtain a sheet measuring 10 cm high, 6 cm wide and 3 mm thick.

The obtained sheet was measured for its thermal conductivity in accordance with the method described above. The result was as shown in Table 1.

Example 2

A spherical aluminum nitride powder was produced in the same manner as in Example 1 but using the boehmite as the Al source instead of using the α-alumina.

The specific surface area, average particle diameter, sphericalness, yield, content of cationic impurities, oxygen concentration and lattice constant of C-axis of the obtained spherical aluminum nitride powder were as shown in Table 1. Further, by using the thus obtained aluminum nitride powder, a sheet was prepared and measured for its thermal conductivity in the same manner as in Example 1. The result was as shown in Table 1.

Example 3

A spherical aluminum nitride powder was produced in the same manner as in Example 1 but conducting the firing at a temperature of 1650° C.

The specific surface area, average particle diameter, sphericalness, yield, content of cationic impurities, oxygen concentration and lattice constant of C-axis of the obtained spherical aluminum nitride powder were as shown in Table 1. Further, by using the thus obtained aluminum nitride powder, a sheet was prepared and measured for its thermal conductivity in the same manner as in Example 1. The result was as shown in Table 1.

Example 4

A spherical aluminum nitride powder was produced in the same manner as in Example 1 but changing the amount of the calcium carbonate which was the eutectic agent into 5.4 parts by mass.

The specific surface area, average particle diameter, sphericalness, yield, content of cationic impurities, oxygen concentration and lattice constant of C-axis of the obtained spherical aluminum nitride powder were as shown in Table 1. Further, by using the thus obtained aluminum nitride powder, a sheet was prepared and measured for its thermal conductivity in the same manner as in Example 1. The result was as shown in Table 1.

Example 5

A spherical aluminum nitride powder was produced in the same manner as in Example 1 but changing the amount of the calcium carbonate which was the eutectic agent into 17.9 parts by mass.

The specific surface area, average particle diameter, sphericalness, yield, content of cationic impurities, oxygen concentration and lattice constant of C-axis of the obtained spherical aluminum nitride powder were as shown in Table 1. Further, by using the thus obtained aluminum nitride powder, a sheet was prepared and measured for its thermal conductivity in the same manner as in Example 1. The result was as shown in Table 1.

Example 6

A spherical aluminum nitride powder was produced in the same manner as in Example 1 but changing the mixing ratio of the α-alumina and the carbon black ($C/Al_2O_3$) into 0.39.

The specific surface area, average particle diameter, sphericalness, yield, content of cationic impurities, oxygen concentration and lattice constant of C-axis of the obtained spherical aluminum nitride powder were as shown in Table 1. Further, by using the thus obtained aluminum nitride powder, a sheet was prepared and measured for its thermal conductivity in the same manner as in Example 1. The result was as shown in Table 1.

Example 7

An aluminum nitride powder was produced in the same manner as in Example 1 but changing the amount of the calcium carbonate which was the eutectic agent into 44.6 parts by mass.

The specific surface area, average particle diameter, sphericalness, yield, content of cationic impurities, oxygen concentration and lattice constant of C-axis of the obtained aluminum nitride powder were as shown in Table 1.

Further, by using the thus obtained aluminum nitride powder, a sheet was prepared and measured for its thermal conductivity in the same manner as in Example 1. The result was as shown in Table 1.

TABLE 1

| | Ex. 1 | Ex. 2 | Ex. 3 | Ex. 4 | Ex. 5 | Ex. 6 | Ex. 7 |
|---|---|---|---|---|---|---|---|
| Production conditions | | | | | | | |
| Al source | *2 | *3 | *2 | *2 | *2 | *2 | *2 |
| Eutectic agent | CaCO3 | CaCO3 | CaCO3 | CaCO3 | CaCO3 | CaCO3 | CaCO3 |
| Amount of eutectic agent (*1) | 8.9 | 8.9 | 8.9 | 5.4 | 17.9 | 8.9 | 44.6 |
| Amount of C powder ($C/Al_2O_3$) | 0.42 | 0.42 | 0.42 | 0.42 | 0.42 | 0.39 | 0.42 |
| Firing temp. (° C.) | 1700 | 1700 | 1650 | 1700 | 1700 | 1700 | 1700 |
| Firing time (hrs) | 15 | 15 | 15 | 15 | 15 | 15 | 15 |
| Results | | | | | | | |
| Specific surface area ($m^2/g$) | 0.60 | 0.50 | 0.66 | 0.70 | 0.40 | 0.66 | 0.39 |
| Ave. ptcl. diameter (μm) | 4.9 | 4.1 | 4.4 | 4.5 | 5.6 | 7.6 | 6.5 |
| Sphericalness (—) | 0.82 | 0.91 | 0.79 | 0.79 | 0.88 | 0.79 | 0.92 |
| Yield (%) | 86.5 | 61.4 | 88.8 | 92.1 | 79.6 | 86.2 | 46.3 |
| Ca content (ppm) | 290 | 240 | 330 | 190 | 540 | 310 | 770 |
| Fe content (ppm) | 3 | 3 | 5 | 3 | 5 | 3 | 3 |
| S content (ppm) | 21 | 16 | 41 | 38 | 6 | 20 | 5 |
| Oxygen concentration (wt %) | 0.58 | 0.49 | 0.64 | 0.81 | 0.33 | 0.55 | 0.31 |
| Lattice const. of C-axis (Å) | 4.9807 | 4.9802 | 4.9805 | 4.9804 | 4.9810 | 4.9806 | 4.9811 |
| Thermal conductivity of sheet (W/mK) | 8.3 | 7.5 | 7.2 | 7.1 | 8.9 | 8.5 | 7.4 |

(*1): per 100 mass pts. of alumina powder

*2: α-alumina,

*3: boehmite

Comparative Example 1

An aluminum nitride powder was produced in the same manner as in Example 1 but changing the mixing ratio of the α-alumina and the carbon black ($C/Al_2O_3$) into 0.36.

The specific surface area, average particle diameter, sphericalness, yield, content of cationic impurities, oxygen concentration and lattice constant of C-axis of the obtained aluminum nitride powder were as shown in Table 2.

Further, the thus obtained aluminum nitride powder was kneaded together with the millable-type silicone and the parting agent by using the pressurized kneader in the same manner as in Example 1 in an attempt to prepare a sheet. However, the viscosity was so large that no sheet could be prepared.

Comparative Example 2

An aluminum nitride powder was produced in the same manner as in Example 1 but changing the mixing ratio of the α-alumina and the carbon black ($C/Al_2O_3$) into 0.48.

The specific surface area, average particle diameter, sphericalness, yield, content of cationic impurities, oxygen concentration and lattice constant of C-axis of the obtained aluminum nitride powder were as shown in Table 2.

Further, the thus obtained aluminum nitride powder was kneaded together with the millable-type silicone and the parting agent by using the pressurized kneader in the same manner as in Example 1 in an attempt to prepare a sheet. However, the viscosity was so large like in Comparative Example 1 that no sheet could be prepared.

Comparative Example 3

An aluminum nitride powder was produced in the same manner as in Example 1 but changing the amount of the calcium carbonate which was the eutectic agent into 0.3 parts by mass.

The specific surface area, average particle diameter, sphericalness, yield, content of cationic impurities, oxygen concentration and lattice constant of C-axis of the obtained aluminum nitride powder were as shown in Table 2.

Further, the thus obtained aluminum nitride powder was kneaded together with the millable-type silicone and the parting agent by using the pressurized kneader in the same manner as in Example 1 in an attempt to prepare a sheet. In this case, too, however, the viscosity was so large that no sheet could be prepared.

Comparative Example 4

An aluminum nitride powder was produced in the same manner as in Example 1 but conducting the firing at a temperature of 1880° C.

The specific surface area, average particle diameter, sphericalness, yield, content of cationic impurities, oxygen concentration and lattice constant of C-axis of the obtained aluminum nitride powder were as shown in Table 2.

Further, by using the thus obtained aluminum nitride powder, a sheet was prepared and measured for its thermal conductivity in the same manner as in Example 1. The result was as shown in Table 2.

Comparative Example 5

An aluminum nitride powder was produced in the same manner as in Example 1 but conducting the firing at a temperature of 1550° C.

The specific surface area, average particle diameter, sphericalness, yield, content of cationic impurities, oxygen concentration and lattice constant of C-axis of the obtained aluminum nitride powder were as shown in Table 2.

Further, the thus obtained aluminum nitride powder was kneaded together with the millable-type silicone and the parting agent by using the pressurized kneader in the same manner as in Example 1 in an attempt to prepare a sheet. In this case, too, however, the viscosity was so large that no sheet could be prepared.

Comparative Example 6

An aluminum nitride powder was produced in the same manner as in Example 1 but shortening the firing time to one hour.

The specific surface area, average particle diameter, sphericalness, yield, content of cationic impurities, oxygen concentration and lattice constant of C-axis of the obtained aluminum nitride powder were as shown in Table 2.

Further, by using the thus obtained aluminum nitride powder, a sheet was prepared and measured for its thermal conductivity in the same manner as in Example 1. The result was as shown in Table 2.

Comparative Example 7

An aluminum nitride powder was produced in the same manner as in Example 1 but changing the amount of the calcium carbonate which was the eutectic agent into 80 parts by mass.

The specific surface area, average particle diameter, sphericalness, yield, content of cationic impurities, oxygen concentration and lattice constant of C-axis of the obtained aluminum nitride powder were as shown in Table 2.

Further, by using the thus obtained aluminum nitride powder, a sheet was prepared and measured for its thermal conductivity in the same manner as in Example 1. The result was as shown in Table 2.

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Production conditions | | | | | | | |
| Al source | *2 | *2 | *2 | *2 | *2 | *2 | *2 |
| Eutectic agent | CaCO3 | CaCO3 | CaCO3 | CaCO3 | CaCO3 | CaCO3 | CaCO3 |
| Amount of eutectic agent (*1) | 8.9 | 8.9 | 0.3 | 8.9 | 8.9 | 8.9 | 80 |
| Amount of C powder ($C/Al_2O_3$) | 0.36 | 0.48 | 0.42 | 0.42 | 0.42 | 0.42 | 0.42 |
| Firing temp. (° C.) | 1700 | 1700 | 1700 | 1880 | 1550 | 1700 | 1700 |
| Firing time (hrs) | 15 | 15 | 15 | 15 | 15 | 1 | 15 |

TABLE 2-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Results |  |  |  |  |  |  |  |
| Specific surface area (m$^2$/g) | 1.11 | 1.00 | 1.60 | 0.49 | 1.53 | 1.50 | 0.33 |
| Ave. ptcl. diameter (μm) | 8.2 | 2.7 | 1.9 | 4.7 | 2.9 | 3.2 | 7.4 |
| Sphericalness (—) | 0.65 | 0.89 | 0.72 | 0.88 | 0.67 | 0.63 | 0.89 |
| Yield (%) | 88.2 | 83.2 | 97.5 | 86.1 | 87.6 | 91 | 33.2 |
| Ca content (ppm) | 280 | 360 | 180 | 170 | 460 | 2030 | 57200 |
| Fe content (ppm) | 3 | 3 | 3 | 3 | 9 | 3 | 4 |
| S content (ppm) | 21 | 26 | 55 | 14 | 47 | 57 | 18 |
| Oxygen concentration (wt %) | 0.72 | 0.98 | 1.11 | 1.13 | 1.30 | 1.20 | 2.61 |
| Lattice const. of C-axis (Å) | 4.9805 | 4.9804 | 4.9797 | 4.9796 | 4.9795 | 4.9782 | 4.9815 |
| Thermal conductivity of sheet (W/mK) | — | — | — | 5.4 | — | 4.3 | 4.2 |

(*1): per 100 mass pts. of alumina powder
*2: α-alumina

INDUSTRIAL APPLICABILITY

The spherical aluminum nitride powder obtained by the present invention has a shape and particle diameter suited for use as a filler and can be highly filled in a matrix such as resin, rubber or silicone oil making it possible to obtain a heat radiating sheet, heat radiating grease, heat radiating adhesive and the like that feature high thermal conductivity.

The invention claimed is:

1. A spherical aluminum nitride powder having an average particle diameter of 3 to 30 μm, a sphericalness of not less than 0.75, and an oxygen concentration which is suppressed to be not more than 1% by weight wherein, when said average particle diameter is d (μm), the specific surface area S (m$^2$/g) satisfies the following formula (1), $$(1.84/d) \leq S \leq (1.84/d+0.5) \quad (1)$$

wherein, "d" is said average particle diameter; and
wherein a lattice constant of C-axis of aluminum nitride crystal particles in the aluminum nitride powder is not smaller than 4.9800.

2. A method of producing the spherical aluminum nitride powder of claim 1, comprising:

providing an alumina or an alumina hydrate having an average particle diameter of not more than 2 μm, a eutectic agent of an oxide, a carbonate or a halide of an alkaline earth metal that is capable of melting together with the alumina at 1200 to 1800° C., and a carbon powder;

mixing 100 parts by mass of said alumina or said alumina hydrate, 0.5 parts by mass to 50 parts by mass of said eutectic agent, and said carbon powder of such an amount that the weight ratio thereof to said alumina or said alumina hydrate (C/Al$_2$O$_3$) is from 0.38 to 0.44; and reductively nitrogenating said alumina or said alumina hydrate in a state where said alumina or said alumina hydrate is dissolved in a liquid phase by holding said mixture in a nitrogen-containing atmosphere at a temperature of 1620 to 1800° C. for 10 to 20 hours.

* * * * *